(12) United States Patent
Uryu (10) Patent No.: US 7,044,264 B2
(45) Date of Patent: May 16, 2006

(54) ELECTRICALLY DRIVEN POWER STEERING SYSTEM FOR VEHICLE

(75) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/052,073

(22) Filed: Feb. 8, 2005

(65) Prior Publication Data

US 2005/0178609 A1    Aug. 18, 2005

(30) Foreign Application Priority Data

Feb. 17, 2004    (JP)    ............................. 2004-040496

(51) Int. Cl.
*B62D 5/04*    (2006.01)

(52) U.S. Cl. ........................................ 180/446; 701/42
(58) Field of Classification Search ................ 180/443, 180/446; 701/41, 42
See application file for complete search history.

(56) References Cited

U.S. PATENT DOCUMENTS 6,380,706 B1 *  4/2002  Kifuku et al. .............. 318/434
6,860,361 B1 *  3/2005  Takatsuka et al. .......... 180/446
6,902,028 B1 *  6/2005  Takatsuka et al. .......... 180/446
2005/0242760 A1 * 11/2005  Fujita et al. ................ 318/434

FOREIGN PATENT DOCUMENTS

JP    A-2002-29432    1/2002

* cited by examiner

*Primary Examiner*—Kevin Hurley
(74) *Attorney, Agent, or Firm*—Posz Law Group, PLC (57) ABSTRACT

It is an object of the present invention to provide an electrical power steering system for a vehicle, in which an abnormal condition of a motor current detecting device for a motor current is detected with high precision. A power steering control unit calculates a target assist torque based on a steering signal from a steering sensor and calculates a motor driving current based on such target assist torque. The control unit then calculates a difference between a motor current in a normal condition and a detected motor current, so that the difference is used as an offset correction amount. The control unit further calculates an upper and a lower limit of the offset correction amount depending on a detected temperature of the motor current detecting device. The control unit finally determines that the motor current detecting device is not in a normal condition, when the offset amount is not within a range between the upper and lower limits of the offset correction amount.

5 Claims, 6 Drawing Sheets

ELECTRICALLY DRIVEN POWER STEERING SYSTEM FOR VEHICLE

CROSS REFERENCE TO RELATED APPLICATION

This application is based on Japanese Patent Application No. 2004-040496 filed on Feb. 17, 2004, the disclosures of which is incorporated herein by reference.

FIELD OF THE INVENTION

The present invention relates to an electrically driven power steering system for a vehicle.

BACKGROUND OF THE INVENTION

In a conventional electrically driven power steering system for a vehicle, a vehicle speed and a steering torque generated at a steering shaft are detected, and a target driving current to a power assist electric motor is calculated based on the detected vehicle speed and the steering torque. Furthermore, a variation between the target driving current and an actual electric current flowing through the electric motor is detected, and thereby the electric motor is feedback controlled in such a way that the above variation becomes zero. As a result, an assist torque for the steering device is obtained in accordance with the vehicle speed and the steering torque. A brushless motor is generally used as the power assist electric motor, so that a possible problem occurring from brushes is avoided and an electrically driven power steering system of a high reliability is obtained.

In the above described conventional system, however, when a detecting error is generated at a current detecting device for detecting an electric current to the brushless motor, a torque ripple will be generated at the brushless motor, which would cause an unpleasant feeling in a steering operation. Accordingly, it has been necessary to correct the detecting error by the current detecting device.

In Japanese Patent Publication No. 2002-29432, for example, an electrical power steering system is disclosed, in which a comfortable steering feeling can be obtained by reducing the torque ripple at the power assist electric motor. Namely, an offset amount is corrected when the offset amount for the current detecting device has been changed due to a temperature variation.

An offset amount, however, depends on a temperature characteristic of each element of the current detecting device, such as an operational amplifier. In some of them, the offset amount increases as the temperature rises, or in some of them, the offset amount decreases as the temperature rises. Furthermore, in some of them, the offset amount increases when the temperature increases or decreases, namely the offset amount has a U-shape characteristic with respect to the temperature change.

In the above described Japanese Patent Publication, however, the temperature characteristic of the current detecting element is not considered. Accordingly, when a permissible range of the offset amount is set in consideration of tolerance of the current detecting element for the temperature characteristic, such permissible range might become too wide to detect an abnormal condition, even when an abnormal condition has occurred at the current detecting portion.

For example, in the prior art, the permissible range of the offset amount is determined in the following manner. In the case that, in FIG. 4, a permissible range of an offset corrective amount (voltage) at a lower temperature T1 is a range V1, and the permissible range at a higher temperature T2 is a range V2 in consideration of the tolerance of the current detecting element, a total permissible range of the offset amount is finally determined as a range V3 covering the ranges V1 and V2. Accordingly, a range V1' is out of the permissible range V1 at the temperature T1, while a range V2' is out of the permissible range V2 at the temperature T2. Nevertheless, those ranges V1' and V2' are respectively considered as a range within the total permissible range V3. As a result, even if the offset voltage is in the range V1' at the temperature T1 or in the range V2' at the temperature T2, those conditions are not determined as the abnormal operating condition.

It can be possible to manufacture the current detecting devices, in which the current detecting elements having the same temperature characteristic (for example, the offset amount always increases as the temperature rises) are selected. It is, however, a problem in such a method, that it requires a larger amount of manufacturing manpower and time, or it requires a larger number of the elements than the actually necessary number for the current detecting devices in view of an extraction rate, or it may cause an increase of the manufacturing cost when the current detecting elements which can not be used for the current detecting devices are disposed or diverted to other uses.

SUMMARY OF THE INVENTION

It is, therefore, an object of the present invention to provide an electrically driven power steering system for a vehicle, in which abnormal condition of the current detecting device can be detected with high precision and the current detecting device can be manufactured at low cost.

According to a feature of the present invention, a power steering control unit calculates a target assist torque based on a steering signal from a steering sensor and calculates a motor driving current based on such target assist torque. The control unit then calculates a difference between a motor current to a steering assist electric motor in a normal condition and a detected motor current detected by a motor current detecting device, so that such difference is used as an offset correction amount. The control unit further calculates an upper and a lower limit of the offset correction amount depending on a detected temperature of the motor current detecting device. The control unit finally determines that the motor current detecting device is not in a normal condition, when the offset amount is not within a range between the upper and lower limits of the offset correction amount.

According to another feature of the present invention, the power steering control unit has a memory device, which memorizes a first upper and lower limits of the offset correction amount at a lower temperature, and also a second upper and lower limits of the offset correction amount at a higher temperature. The power steering control unit calculates the upper limit of the offset correction amount at the detected temperature from the first and second upper limits, and the power steering control unit likewise calculates the lower limit of the offset correction amount at the detected temperature from the first and second lower limits.

According to the above feature, the upper and lower limits can be calculated depending on the respective detected temperature of the motor current detecting device. As a result, the abnormal condition of the motor current detecting device can be determined with high precision, irrespectively of temperature characteristics of each electronic elements or devices forming the motor current detecting device (such as, an operational amplifier, and so on).

According to a further feature of the present invention, the motor current detecting device comprises a shunt resistance provided in a passage through which motor current flows. The motor current detecting device detects a voltage appearing at both ends of the shunt resistance as the motor current, and the voltage appearing at both ends of the shunt resistance when no motor current flows is determined as an offset correction amount.

As a result, the motor current can be detected by a simple structure and at a low cost, when compared with a case in which the motor current is directly detected.

According to a further feature of the present invention, the power steering control unit changes the offset correction amount, when it determines the motor current detecting device is not in a normal operating condition, and the upper limit or the lower limit is used as a new offset correction amount in such a case.

As a result, even in a case that an initially memorized offset correction amount is not in a normal range, the offset amount can be changed to another amount, so that an operation of the power assist electric motor can not be adversely affected.

According to a still further feature of the present invention, the power steering control unit calculates the motor driving current in such a manner that the offset correction amount memorized in the memory device depending on the detected temperature is subtracted from a voltage corresponding to the motor current detected by the motor current detecting device, and the difference as subtracted as above is multiplied by a predetermined conversion coefficient.

As a result, the optimum motor current can be obtained independently from the temperature changes at the motor current detecting device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

An embodiment of the present invention will be explained with reference to the drawings.

Figure 1:
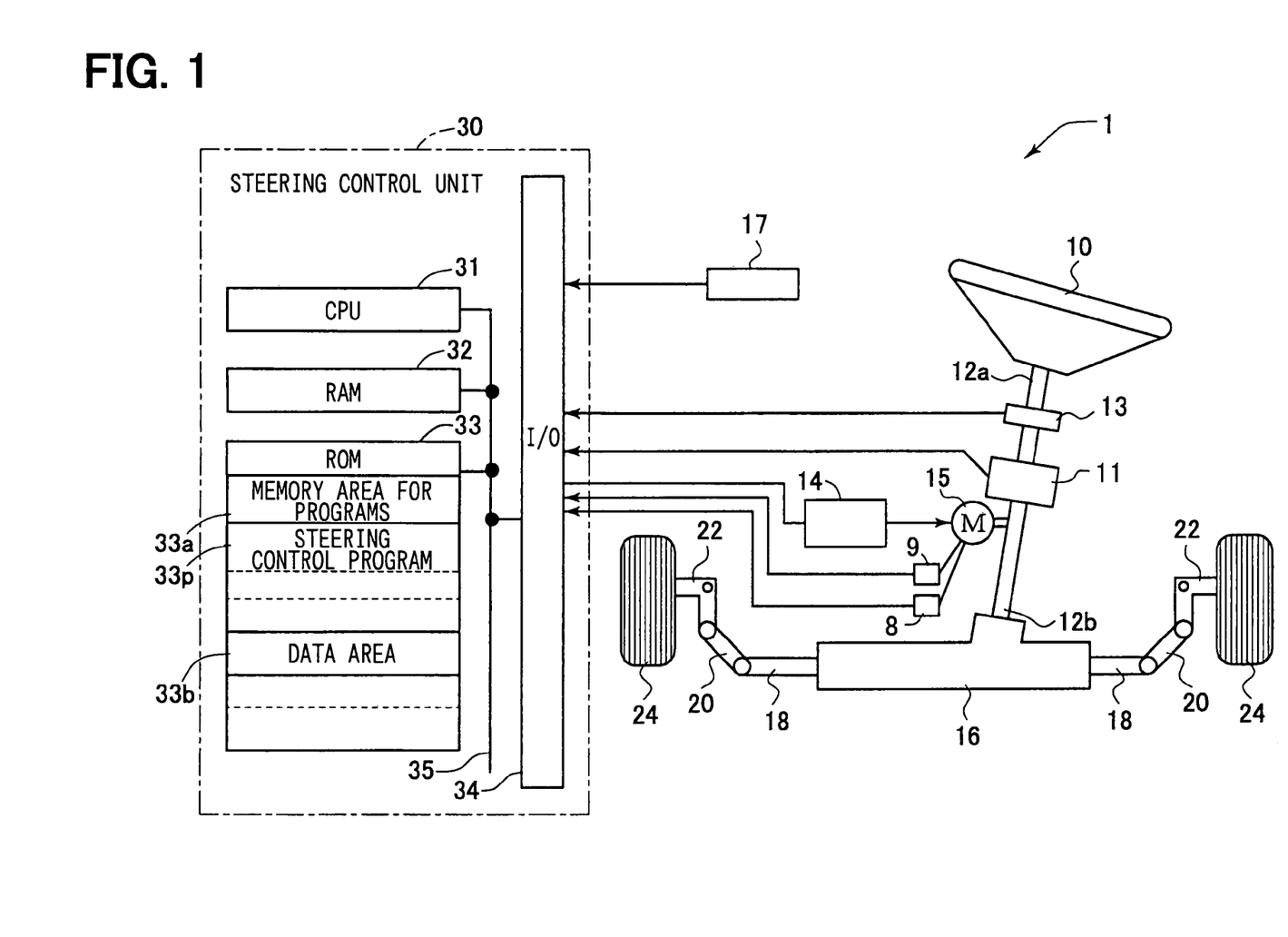
FIG. 1 is a schematic view showing an electrical power steering system according to the present invention.

In FIG. 1 showing a schematic view of an electrical power steering device 1, a driver's wheel 10 is connected to a steering shaft 12a, at a lower end of which a torque sensor 11 is provided. An upper end of a pinion shaft 12b is connected to the torque sensor 11 and a lower end of the pinion shaft 12b is provided with a pinion (not shown). The pinion is engaged with rack bars 18 in a steering gear box 16. A pair of tie-rods 20 is respectively connected to at each end to the rack bar 18, and connected at other ends to the respective tires (steering wheels) 24 through knuckle arms 22.

A steering assist motor 15 is operatively connected to the pinion shaft 12b via gears (not shown). The power steering device 1 is so-called a column type electrically driven device.

The torque sensor 11 comprises a torsion bar (not shown) and a pair of resolvers (not shown) spaced in a longitudinal direction of the torsion bar. When the driver's wheel 10 is rotated, a torque corresponding to a rotation of the driver's wheel 10 is applied to the torsion bar, and thereby an angle difference at both ends of the torsion bar is detected by the resolvers. The torque applied to the torsion bar is calculated based on the detected angle difference and a spring constant of the torsion bar. Information of the detected amounts by the resolvers (the torque sensor 11) is inputted into a steering control unit 30.

A rotational angular position of the electric motor 15 is detected by a rotational angle sensor 9, which comprises an angular position detecting portion being composed of a well-known rotary encoder or a resolver. The detected rotational angle signal is inputted into the steering control unit 30.

The steering control unit 30 comprises a CPU 31, a RAM 32, a ROM 33, an I/O 34 (an interface for an input and an output), and a bus line 35 for connecting those components with each other. The CPU 31 performs its control in accordance with programs and data memorized in the ROM 33 and the RAM 32. The ROM 33 has a memory area 33a for the programs, in which a steering control program 33p is stored, and a data area 33b for memorizing data, in which data necessary for an operation of the steering control program 33p are stored.

The CPU 31 of the steering control unit 30 calculates a driving torque (a target torque) corresponding to a steering torque detected by the torque sensor 11 by performing the steering control program 33p stored in ROM 33, and applies a voltage to the electric motor 15 via a driver circuit 14 to generate the calculated driving torque at the electric motor 15. The steering control unit 30 calculates an actual torque generated at the electric motor 15 based on a detected motor current detected by a motor current sensor 8 and feedback controls to make the actual torque equal to the driving torque. The electric motor 15 is not limited to a brushless motor, and any kinds of electric motors (DC motors, etc.) can be used. The power steering system further comprises a vehicle speed sensor 17 for detecting a vehicle speed.

Figure 2:
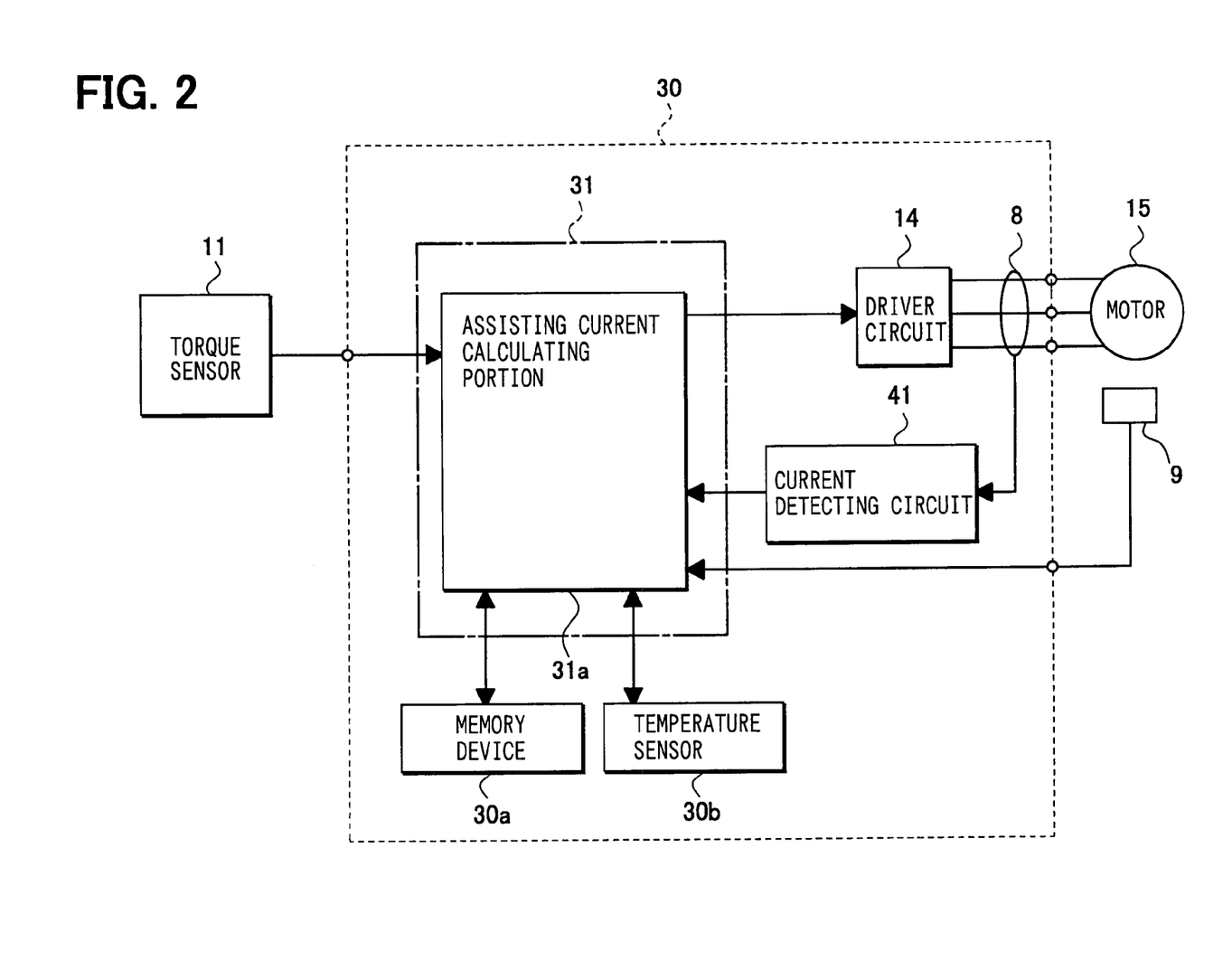
FIG. 2 is a block diagram showing a steering control unit according to the present invention.

In FIG. 2 showing a block diagram of the steering control unit 30, phase current flowing in the respective phases of the electric motor 15 is detected by the motor current sensor 8 and detected current signals are sent to a current detecting circuit 41. An assisting current calculating portion 31a of CPU 31 calculates a command current signal based on the signal of the steering torque from the torque sensor 11 and the current signal from the current detecting circuit 41 (and the motor current sensor 8), and sends it to the driver circuit 14 so that the driver circuit 14 drives the electric motor 15 with driving current based on the command current signal. When calculating the command current signal at the assisting current calculating portion 31a, a signal for a rotational angle of the electric motor 15 from the rotational angle sensor 9 can be further used.

A memory device 30a comprises a well-known EEPROM, which holds data even during an electric power is not supplied to the steering control unit 30. A temperature sensor 30b comprises likewise a well-known thermistor, which changes an electric resistance depending on a temperature change, and detects a temperature of the current detecting circuit 41 as well as other circuit portion adjacent to the current detecting circuit 41.

Figure 6:
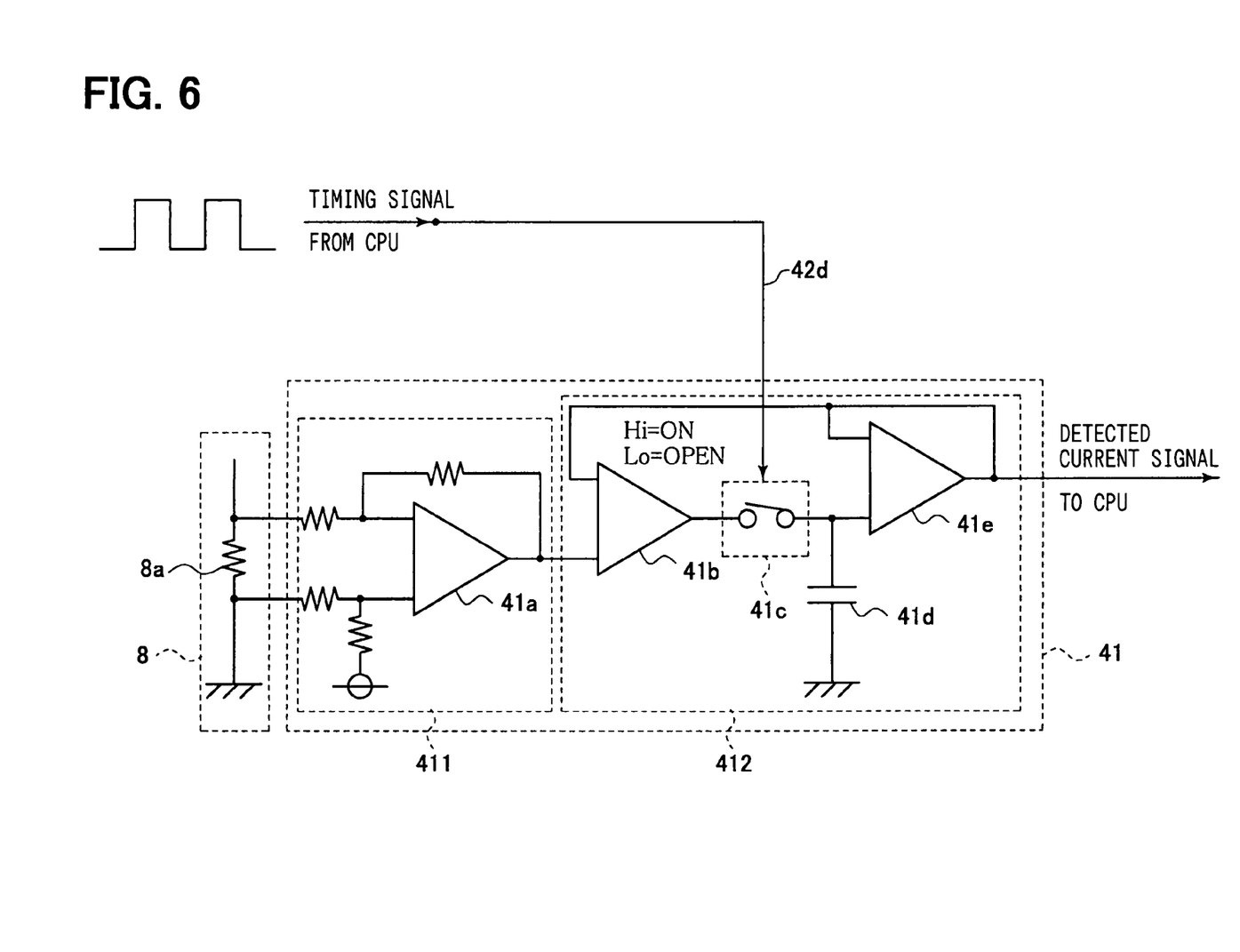
FIG. 6 is a diagram showing a structure of a current detecting circuit.

FIG. 6 shows an example of a structure of the current detecting circuit 41. The motor current sensor 8 comprises a shunt resistance 8a in each current phase and detects a motor current flowing in the electric motor 15 as a voltage signal. The detected voltage signal is amplified by an amplifying portion 411 having a well-known operational amplifier 41a.

The amplified voltage signal is then sent to a sample-holding portion 412 comprising operational amplifiers 41b and 41e and a capacitor 41d. The sample-holding portion 412 further comprises a switching device 41c, which is changed to an ON state and an OFF state depending on a timing signal (a pulse signal) from CPU 31. Namely, when the timing signal is at a high level, the switching device 41c is changed to the ON state so that the capacitor 41d is electrically charged or discharged depending on the electric potential at the operational amplifier 41b. Then, when the timing signal becomes a low level, the switching device 41c is changed to the OFF state so that the electrical charge at the capacitor 41d is held at its charged condition, and the electrical potential corresponding to the electrical charge at the capacitor 41d appears at the operational amplifier 41e. The electrical potential is sent to the assisting current calculating portion 31a as the detected current signal.

An operation of updating the offset voltage is explained. At first, a conventional process for updating the offset voltage is explained with reference to FIG. 5.

Figure 5:
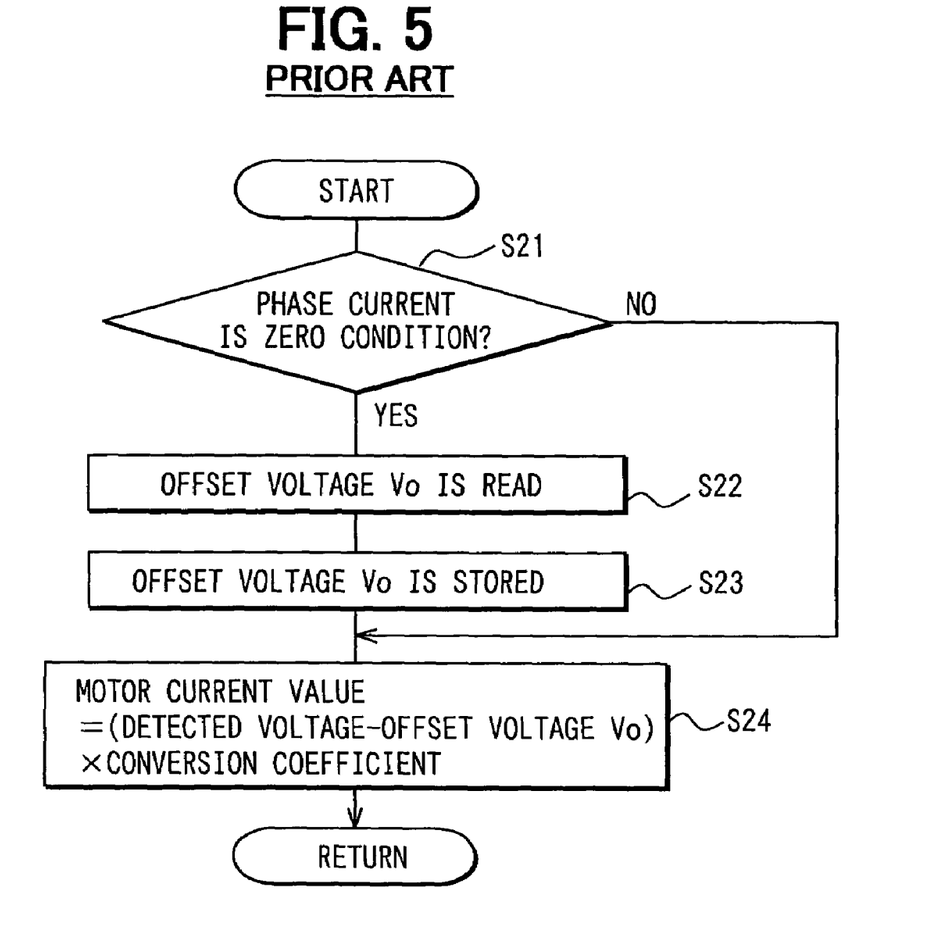
FIG. 5 is a flow chart showing current calculating process of the conventional steering control unit.

At first, it is determined at a step S21 whether phase currents between the respective phases detected by the motor current sensor 8 are zero condition or not. When the phase currents are not zero condition, the process goes on to a step S24. Accordingly, in this case the offset voltage is not updated.

When the phase currents are zero condition at the step S21, the process goes on to a step S22, at which the voltage (electrical potential difference) appearing at both ends of the shunt resistance 8a is read as the offset voltage, and then such offset voltage is stored in the memory device 30a at a step S23.

A motor current value is then calculated at a step S24, in which the offset voltage (Vo) is subtracted from the detected motor current (the electrical potential difference at both ends of the shunt resistance 8a) and multiplied by a conversion coefficient.

In the above conventional process for calculating the motor current, a process for checking whether the offset voltage is within a range of an upper and a lower limit is not existing. Furthermore, such a process, in which the upper and lower limit for the offset voltage is varied depending on the temperature change, is not existing either.

Figure 3:
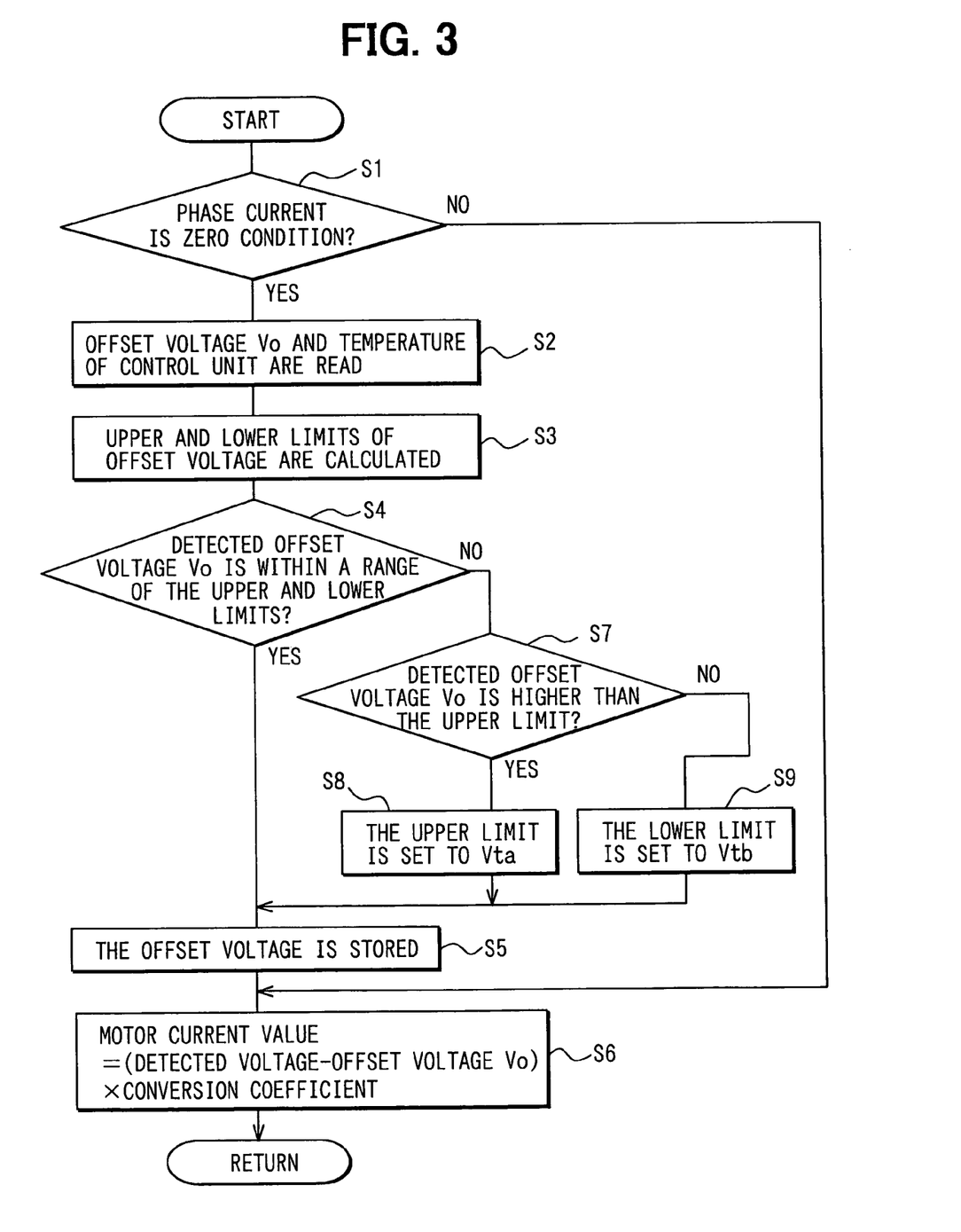
FIG. 3 is a flow chart showing current calculating process of the steering control unit.

Now, an operation of updating the offset voltage according to the present invention is explained with reference to FIGS. 3 and 4.

At first, it is determined at a step S1 whether phase currents between the respective phases detected by the motor current sensor 8 are zero condition or not. When the phase currents are not zero condition, the process goes on to a step S6. Accordingly, in this case the offset voltage is not updated.

When the phase currents are zero condition at the step S1, the process goes on to a step S2, at which the voltage (electrical potential difference) appearing at both ends of the shunt resistance 8a is read as the offset voltage Vo, and the temperature of the steering control unit 30 (the temperature of the current detecting circuit 41) detected by the temperature sensor 30b is read.

Figure 4:
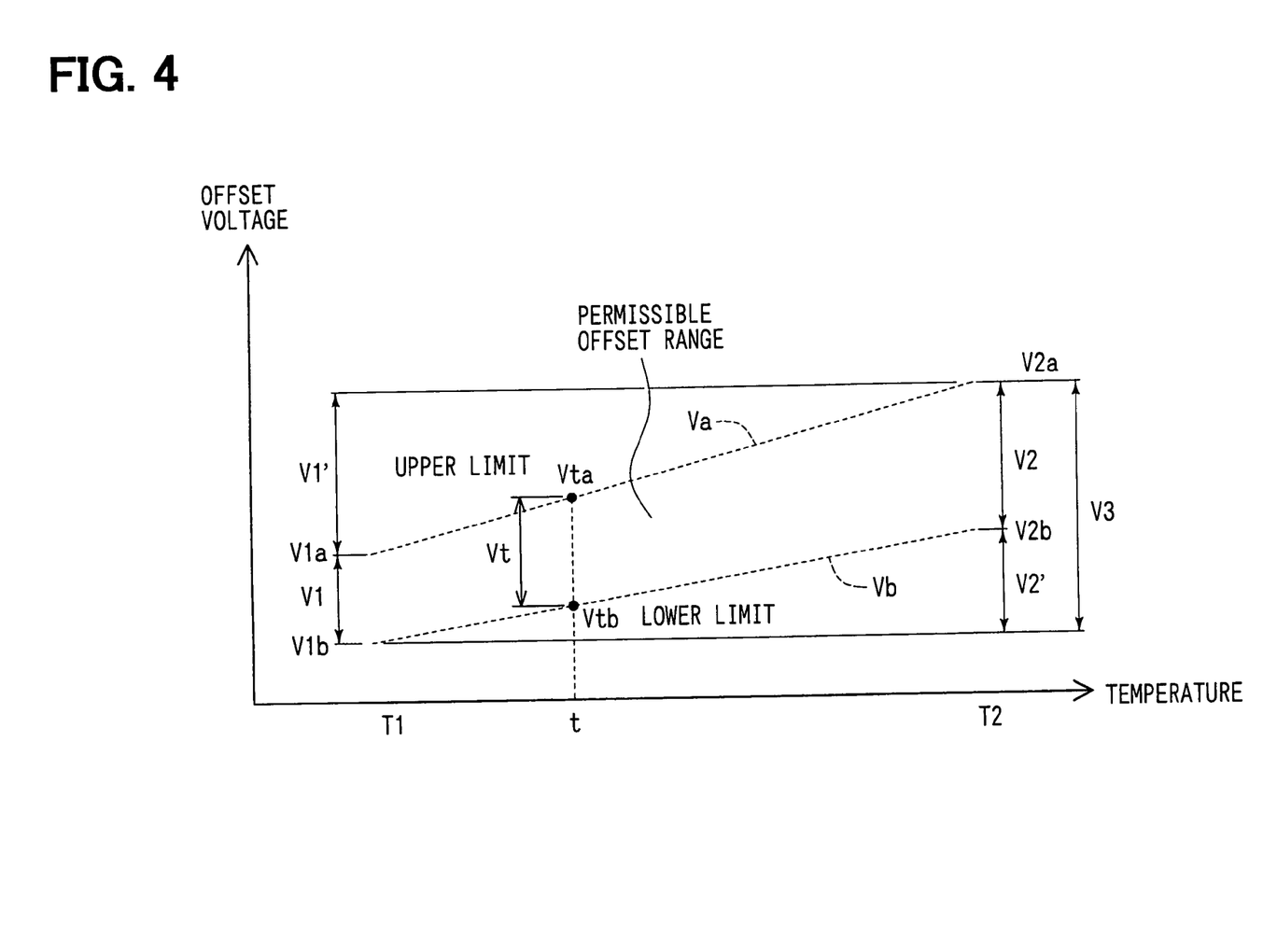
FIG. 4 is a diagram showing a relationship between an offset voltage and temperature.

At a step S3, the upper and lower limits of the offset voltage Vo is calculated based on the temperature (t) in accordance with the relationship between the offset voltage and the temperature shown in FIG. 4. For example, the upper limits V1a and V2a of the offset voltages at the respective temperatures T1 (at a lower temperature) and T2 (at a higher temperature) are memorized in advance in the memory device 30a, and an upper limit Vta of the offset voltage at the temperature t is calculated from a line Va connecting the upper limits V1a and V2a, by a linear interpolation method or the like. A lower limit Vtb of the offset voltage at the temperature t is calculated in the same manner.

At a step S4, it is determined whether the offset voltage Vo detected at the step S2 is within a permissible offset range Vt between the Vtb and Vta. In the case that the detected offset voltage Vo is within the permissible offset range Vt, the process goes on to a step S5, at which the detected offset voltage Vo is memorized in the memory device 30a.

In the case that the detected offset voltage Vo is not within the permissible offset range Vt, the process goes on to a step S7, at which it is determined whether the detected offset voltage Vo is higher than the upper limit Vta. And in the case that the detected offset voltage Vo is higher than the upper limit Vta, then the offset voltage is set to the voltage Vta, at a step S8. On the other hand, when the detected offset voltage Vo is lower than the lower limit Vtb, then the offset voltage is set to the voltage Vtb, at a step S9.

The offset voltage (Vta or Vtb) decided at the step S8 or S9 is memorized in the memory device 30a, at the step S5.

A motor current value is finally calculated, at a step S6, from the detected motor current (the electrical potential difference at both ends of the shunt resistance 8a) and the offset voltage Vo memorized in the memory device 30a. In this step S6, the offset voltage (Vo) is subtracted from the detected motor current (the electrical potential difference at both ends of the shunt resistance 8a) and multiplied by a conversion coefficient (e.g. a resistor value of the shunt resistance 8a).

In the above explained embodiment, the upper and lower limits (Vta and Vtb) of the offset voltage at the temperature t are decided from the connecting lines Va and Vb. However, the method for setting the upper and lower limits of the offset voltage at the respective temperatures is not limited to the above explained method. For example, in the case that the detected offset voltage Vo at the temperature t is within the permissible offset range Vt, the upper and lower limits can be set to such values, which has a predetermined range above and below the detected offset voltage Vo. For example, the upper limit can be set to such a value, which is Vo+0.1 (V), while the lower limit can be set to such a value, which is Vo−0.1(V). Those upper and lower limits at the temperature t are memorized in the memory device 30a at the step S5.

Furthermore, the upper and lower limits of the offset voltage can be alternatively decided in the following manner. Namely, the upper and lower limits at the temperature t are decided in the above explained process. In the case that the temperature is changed from t to t', which is between T1 and t, a new upper limit can be decided by the linear interpolation method based on a line connecting the upper limit V1a at the temperature T1 with the upper limit Vta at the temperature t. A new lower limit of the offset voltage at the temperature t' is calculated in the same manner.

What is claimed is:

1. An electrical power steering system for a vehicle comprising:
   a steering assist electric motor for applying a steering assist torque to a steering device operatively linked with steering wheels;
   a steering sensor for detecting a steering operation of a driver's wheel;
   a motor current detecting means for detecting a motor current supplied to the steering assist electric motor;
   a power steering control unit for calculating a target assist torque based on a steering signal from the steering sensor, and calculating a motor driving current based on the target assist torque; and
   a driver circuit for driving the steering assist electric motor with the motor driving current calculated by the power steering unit,
   wherein the power steering control unit calculates a difference between a motor current in a normal operation and the detected motor current by the motor current detecting means, and memorizes the difference as an offset correction amount in a memory device,
   the power steering control unit comprises a temperature sensor for detecting a temperature of a current detecting circuit of the motor current detecting means,
   the power steering control unit calculates an upper limit and a lower limit of the offset correction amount depending on the detected temperature of the current detecting circuit, and
   the power steering control unit determines that the current detecting means is not in a normal operating condition, when the offset amount is not within a range between the lower and upper limits of the offset correction amount.

2. An electrical power steering system according to claim 1, wherein
   the memory device of the power steering control unit memorizes a first upper and lower limits of the offset correction amount at a lower temperature, and also a second upper and lower limits of the offset correction amount at a higher temperature, and
   the power steering control unit calculates the upper limit of the offset correction amount at the detected temperature from the first and second upper limits, and the power steering control unit likewise calculates the lower limit of the offset correction amount at the detected temperature from the first and second lower limits.

3. An electrical power steering system according to claim 1, wherein
   the motor current detecting means comprises a shunt resistance interposed in a passage through which the motor current flows,
   the motor current detecting means detects a voltage appearing at both ends of the shunt resistance as the motor current, and
   the voltage appearing at the shunt resistance when no motor current flows is determined as the offset correction amount.

4. An electrical power steering system according to claim 1, wherein
   the power steering control unit changes the offset correction amount, when it determines that the current detecting means is not in a normal operating condition, and
   the upper limit or the lower limit is used as a new offset correction amount, which will be memorized in the memory device.

5. An electrical power steering system according to claim 1, wherein
   the power steering control unit calculates the motor driving current, in such a manner that
   the offset correction amount memorized in the memory device depending on the detected temperature is subtracted from the voltage corresponding to the motor current detected by the motor current detecting means, and
   the difference as subtracted as above is multiplied by a predetermined conversion coefficient.

* * * * *